Patented July 6, 1937

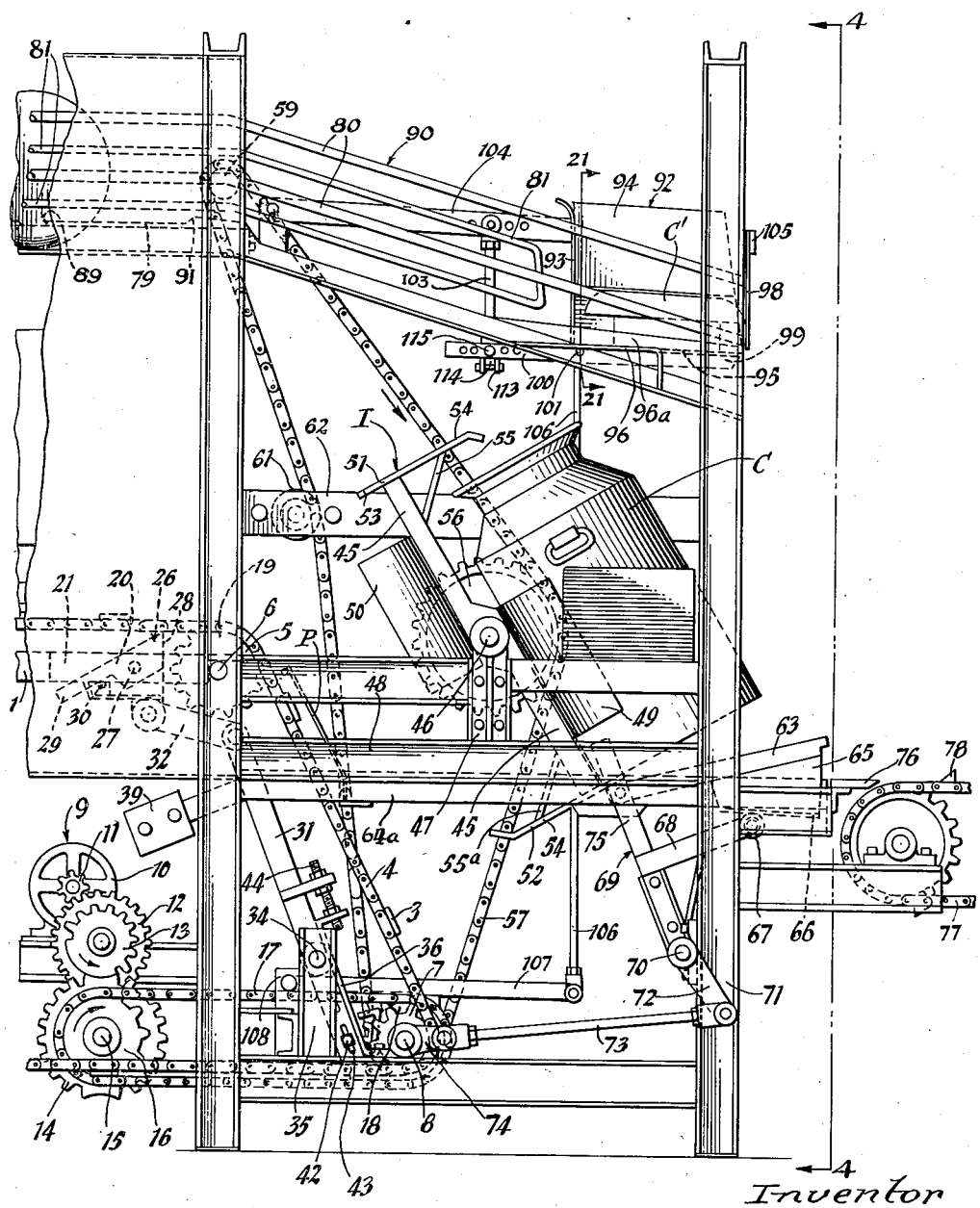

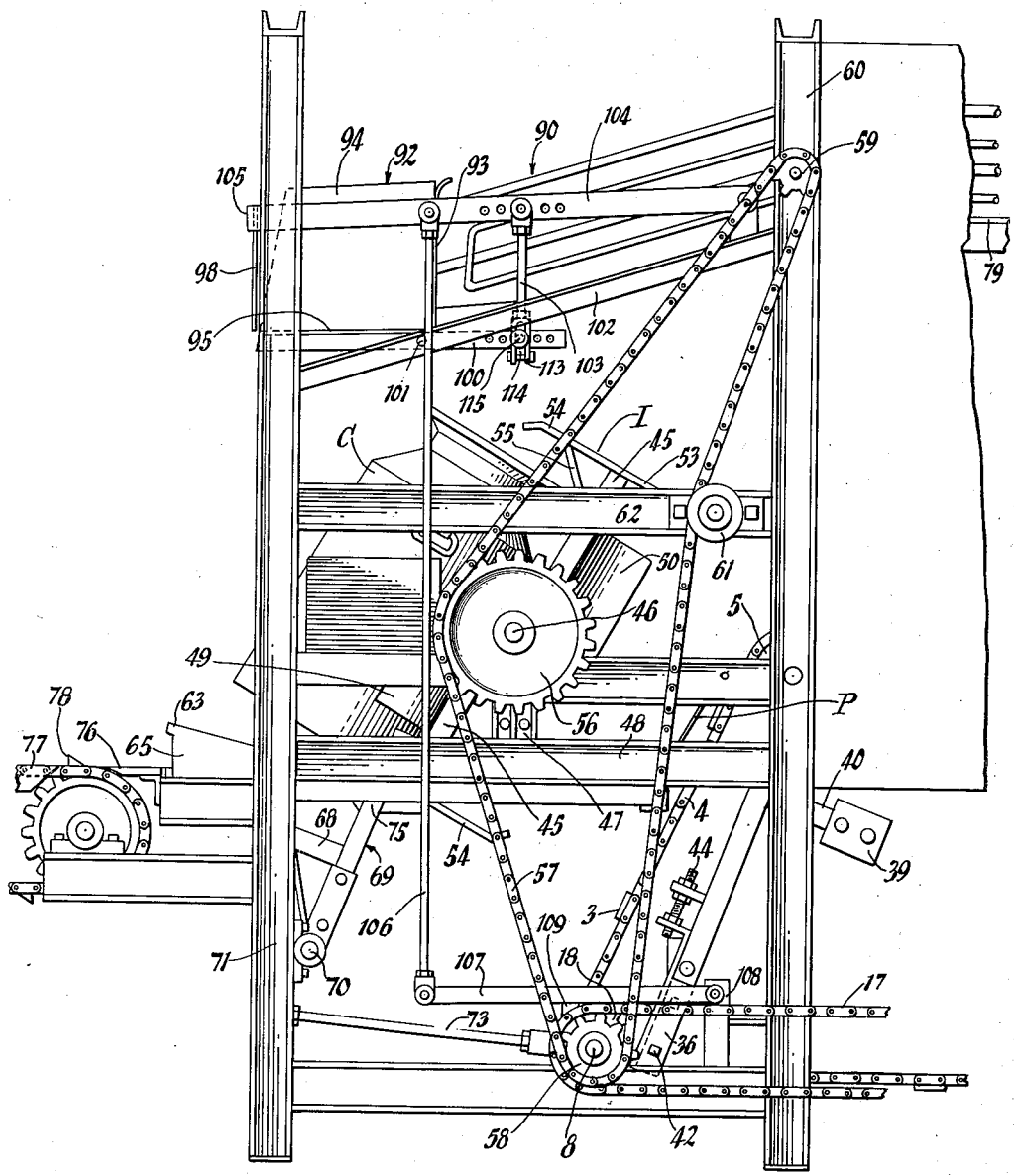

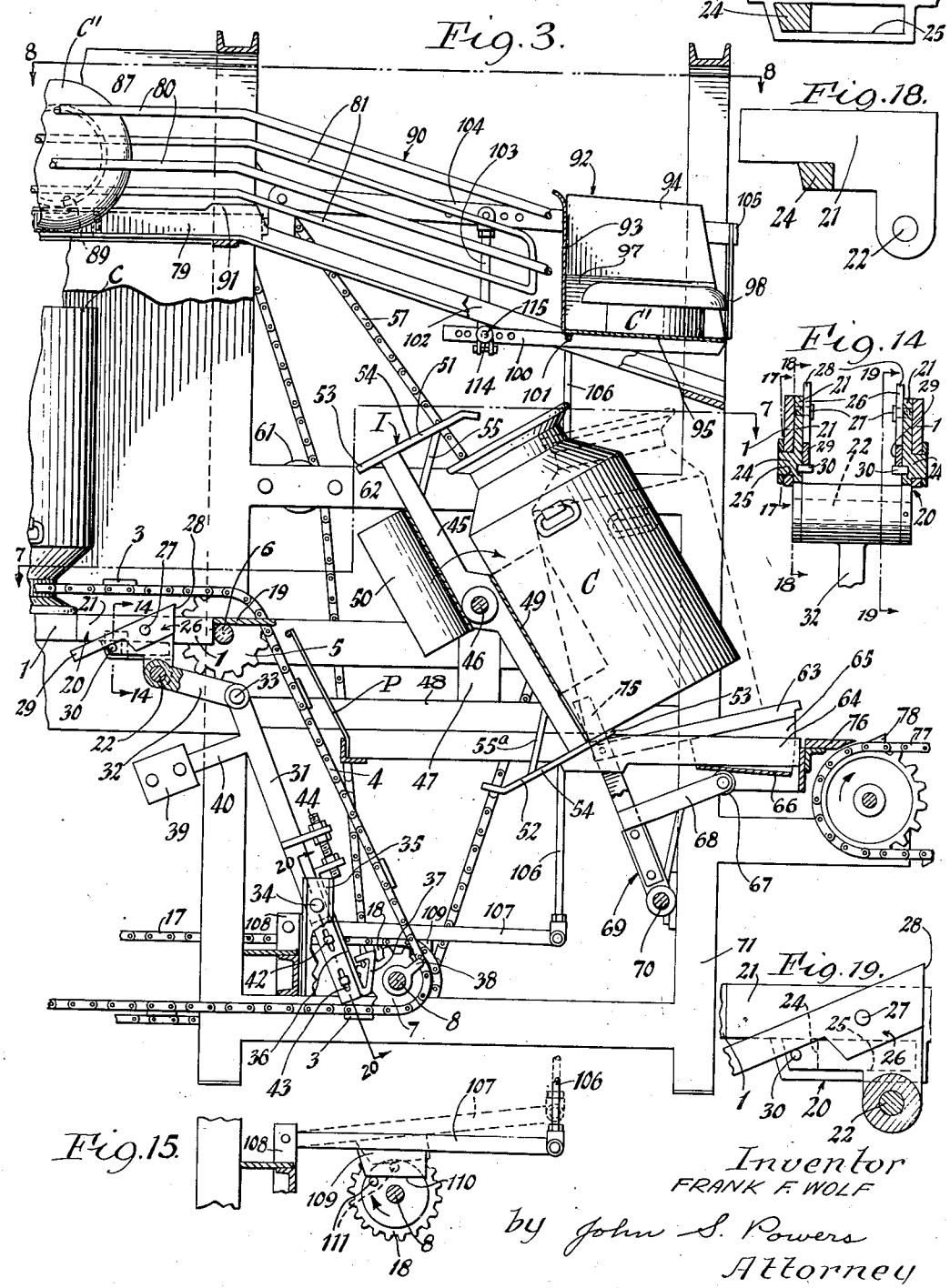

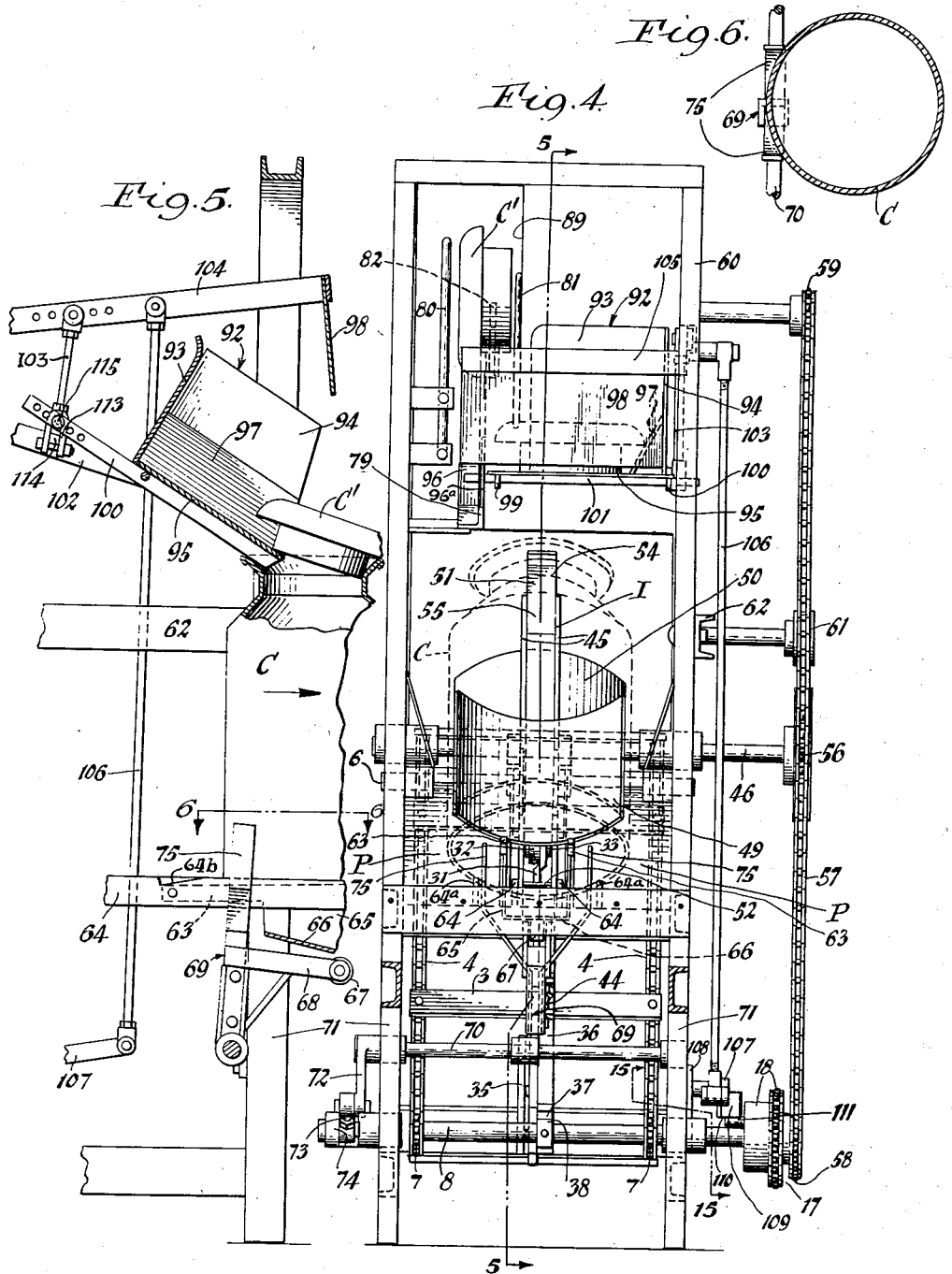

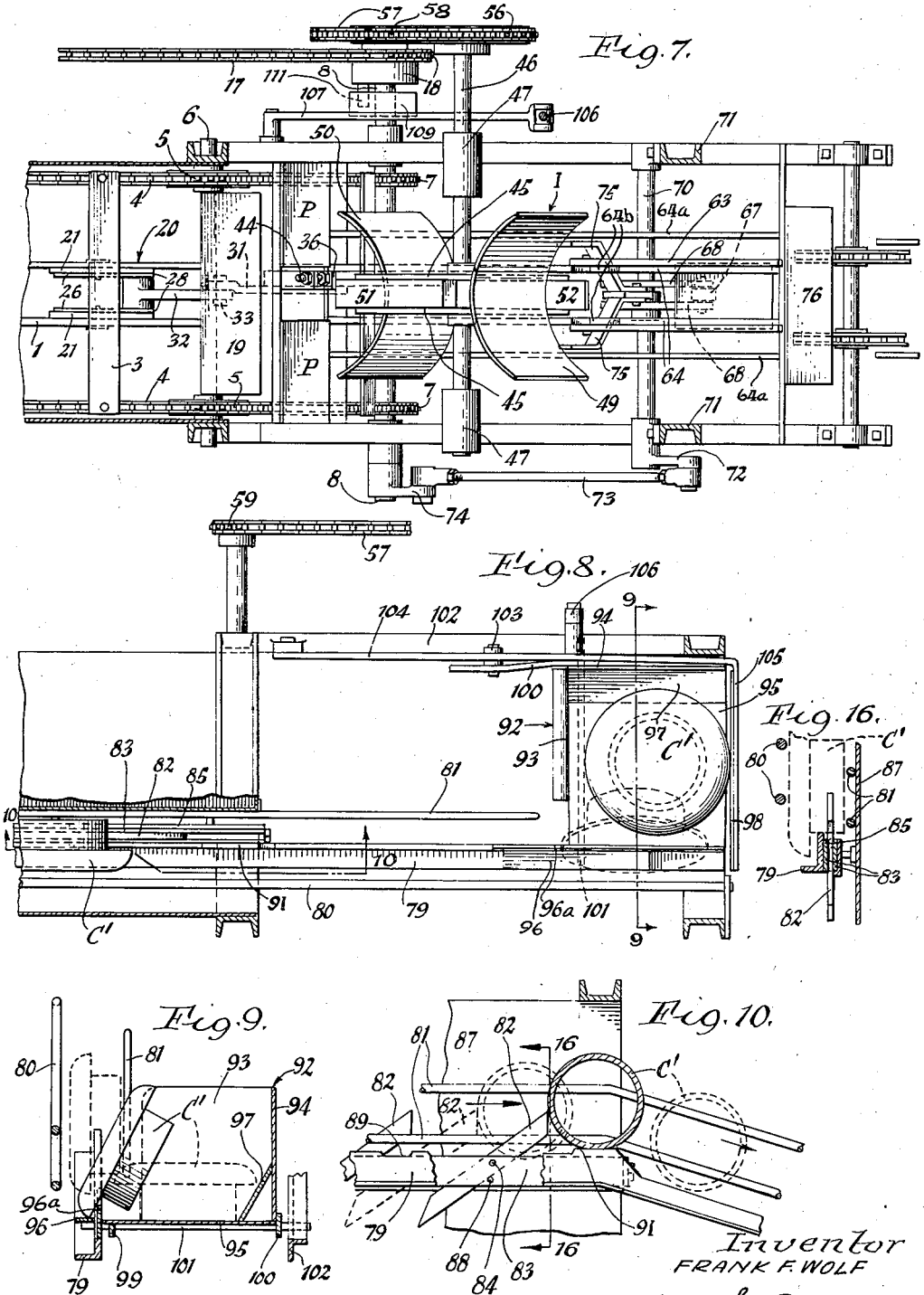

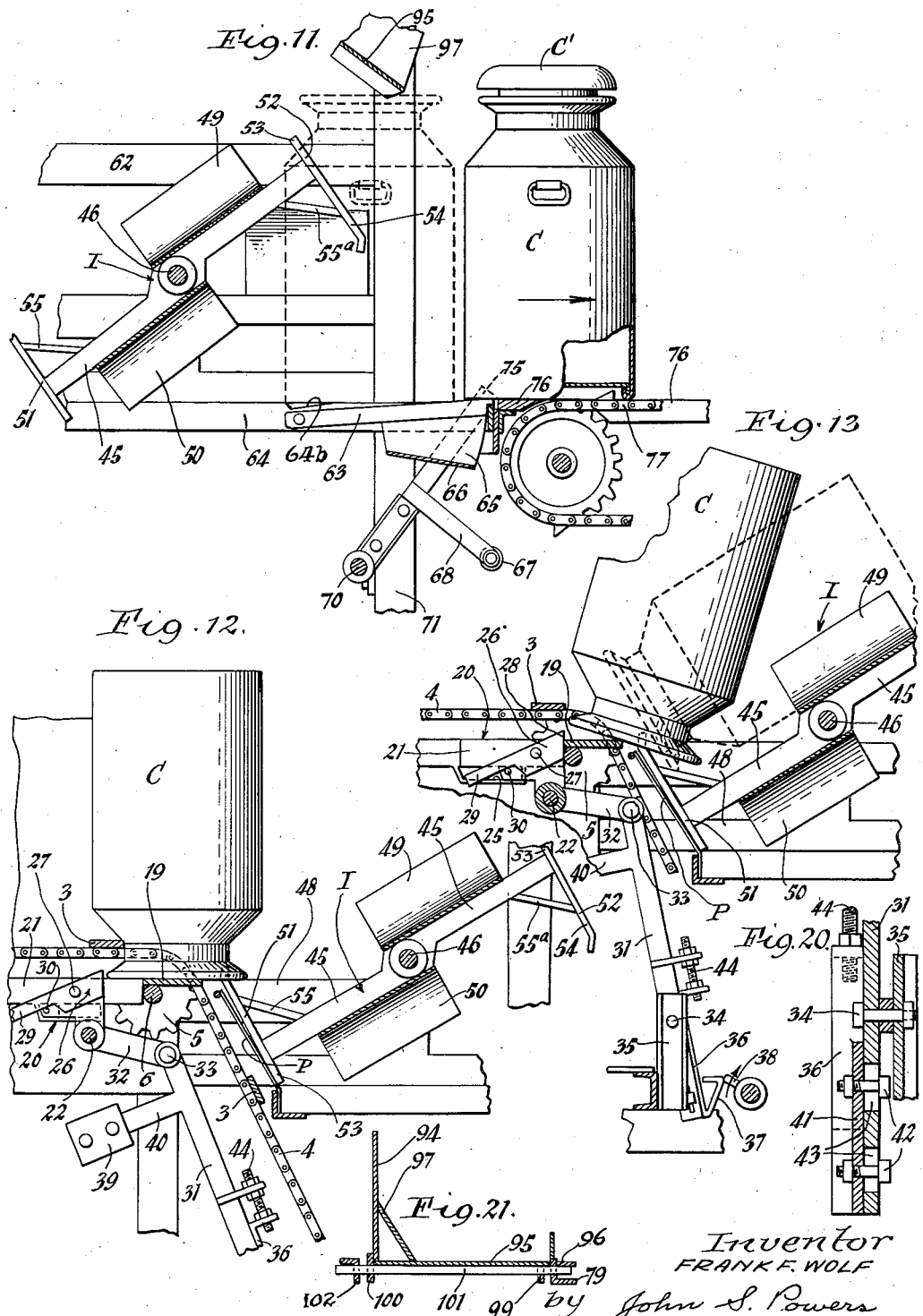

2,085,936

UNITED STATES PATENT OFFICE 2,085,936

CAN WASHING MACHINE

Frank F. Wolf, Cattaraugus, N. Y., assignor to Oakes & Burger Co., Inc., Cattaraugus, N. Y., a corporation of New York Application December 7, 1935, Serial No. 53,375

29 Claims. (Cl. 29—84)

This invention relates to can washing machines of the kind in which the receptacles, such as milk cans for example, are caused to move, while inverted, in a prescribed path, the various cleansing mediums being introduced into the receptacles as they pause at predetermined positions along said path and more particularly the invention is concerned with improvements in machines of the character generally described wherein provision is made for righting the receptacles and replacing their covers after the cleansing operations.

One object of the invention is to provide a machine in which the mechanism for righting the cans is operative to deposit the latter gently in an upright position upon the support along which they are to be advanced during replacement of the covers.

A further object is to provide a machine having a can inverting mechanism which is adapted to right the receptacles without marring or otherwise injuring them.

A still further object is to provide a machine having a cover applying mechanism which is adapted to replace the covers upon the receptacles upon completion of the cleansing operations, the said mechanism adapting itself, within limits, to receptacles and covers of various sizes and styles.

A still further object is a novel arrangement of the parts of the receptacle inverting and cover applying mechanisms, whereby simplicity in construction and economy in operation are obtained.

The invention is illustrated in the accompanying drawings, in which:

Figure 1 is a view in elevation of one side of the delivery end of a machine embodying the features of the invention.

Figure 2 is a similar view of the opposite side of the machine.

Figure 3 is a view similar to Figure 1, portions of the can inverting and cover applying mechanisms being shown in section.

Figure 4 is a vertical transverse section taken along line 4—4 of Figure 1.

Figure 5 is a vertical longitudinal section taken along line 5—5 of Figure 4, the parts being shown in the position they occupy during replacement of the cover of a receptacle.

Figure 6 is a fragmentary section taken along line 6—6 of Figure 5.

Figure 7 is a horizontal section taken along line 7—7 of Figure 3.

Figure 8 is a similar section taken along line 8—8 of Figure 3.

Figure 9 is a transverse section taken along line 9—9 of Figure 8.

Figure 10 is a longitudinal section taken along line 10—10 of Figure 8.

Figure 11 is a fragmentary longitudinal section showing the relation of the parts after a cover has been replaced upon a receptacle and the latter is being moved upon the receiving platform.

Figure 12 is a fragmentary longitudinal section showing the receptacle inverter in a receiving position just prior to the delivery of a receptacle to it.

Figure 13 is a similar section showing the receptacle tipping forward into the inverter.

Figure 14 is an enlarged fragmentary section taken along line 14—14 of Figure 3.

Figure 15 is a fragmentary section taken along line 15—15 of Figure 4.

Figure 16 is a transverse section through the cover runway and is taken along line 16—16 of Figure 10.

Figures 17, 18, and 19 are fragmentary sections taken along lines 17—17, 18—18 and 19—19, respectively, of Figure 14.

Figure 20 is a fragmentary section taken along line 20—20 of Figure 3.

Figure 21 is a vertical section taken along line 21—21 of Figure 1.

The can righting and cover replacing mechanisms are, as illustrated, incorporated in a machine for washing and sterilizing milk cans and their covers, the apparatus for performing the washing and sterilizing operations being of any suitable design and being sufficiently indicated by a showing, at the delivery end of the machine, of the runways for the cans and their covers C and C', respectively. The runways for the cans include parallel rails 1 (Figures 3 and 7) upon which the cans are arranged in an inverted position. The cans are moved in spaced relation along the can runway by bars 3 which are carried by endless chains 4. The upper runs of the chains extend along opposite sides of the runway in a plane above the rails 1, whereby the bars 3 engage the necks of the cans to push the latter along the rails 1 during forwarding movements of the chains. At the delivery end of the machine the chains 4 pass around a pair of sprockets 5 which are carried by an upper shaft 6 and around a pair of sprockets 7 which are carried by a lower shaft 8, it being understood, of course, that the said chains pass around suitable cooperating sprockets at the opposite end of the machine.

The movement of the chains 4 to advance the cans along the can runway in the manner described is effected by a drive mechanism 9 (Figure 1). The said mechanism includes a motor 10. The armature shaft of the latter carries a pinion 11 which is connected through reducing gears 12 and 13 with a driven gear 14. The driven gear is carried by a shaft 15 which also carries a sprocket 16, the said sprocket being connected by a chain 17 to a sprocket 18 which is fixed to the shaft 8. The gears 13 and 14 are mutilated so that as the former rotates continuously the latter rotates intermittently, the gear 14 making one revolution during each two revolutions of the gear 13 and pausing twice during each revolution. The drive mechanism 9 is, therefore, operative to move the cans step-by-step along the runway, the pauses between movements being of a duration adequate to enable the desired cleansing operations to be performed. As the washing and sterilizing operations are completed the cans approach the end of the runway and move across a transversely arranged plate 19 (Figure 12), the cans becoming overbalanced as they move beyond the forward edge of the said plate and tipping forward, as best shown in Figure 13, into an inverter I which is adapted to complete their movement toward an upright position. The drive mechanism 9 is so designed that a can is discharged from the can runway during each second forwarding movement of the chains 4, it being understood, of course, that a can is introduced into the machine prior to each second forwarding movement of the said chains.

As the cans tip forward in the manner described they utilize the forward edge of the plate 19 as a pivot. The bars 3 which engage the necks of the cans to push the latter along the can runway overlie the flared flanges which define the mouths of the cans, as best shown in Figure 12. In order to insure free pivotal movement of the cans upon the forward edge of the plate 19 means is provided for accelerating the speed of the cans during their final movement along the runway, whereby to move them in advance of, and hence out of engagement with, the bars 3. The said means includes a carriage 20 which is arranged between the rails 1, as best shown in Figure 14, and which comprises side plates 21, the said plates being connected at their forward ends by a pin 22. The side plates 21 are formed or provided with lateral projections 24 which fit in slots 25 formed in the rails 1, the slots 25 being elongated to permit a reciprocatory movement of the carriage. Dogs 26 are carried by the plates 21. The former are mounted for free pivotal movement upon pins 27 and normally occupy positions in which their nose portions 28 extend above the rails 1. The tail portions 29 of the dogs cooperate with pins 30 to limit the upward movement of the nose portions while permitting downward movement of said portions as the cans pass over them, the said dogs, owing to their greater weight of the tail portions 29, returning to their normal positions as they are released by the cans. The carriage 20 is connected to the upper end of an arm 31 by a link 32 (Figure 3), one end of the said link being connected to the carriage by the pin 22 while the opposite end of the link is connected to the upper end of the arm 31 by a pin 33. The arm 31 is mounted intermediate its ends upon a shaft 34 which is carried by an angle member 35, the said member being suitably secured in the framework of the machine. At its lower end the arm 31 carries a slide 36 which is formed to provide an angularly inclined cam surface 37. The said cam surface is located opposite the shaft 8 and co-operates with a cam 38 carried thereby to move the carriage 20 in the direction of movement of the chains 4, the cam surface and cam 37 and 38, respectively, being so designed that the carriage 20 moves with, but at a greater speed than, the chains. As the cam 38 passes beyond the cam surface 37 the arm 31 is released and is returned to its normal position by a weight 39 which is carried by a lateral extension 40, the carriage 20 being returned to its original position during such movement of the said arm. The slide 36 is adjustable along the arm 31 to vary the magnitude and timing of the carriage movements. To this end the said slide is formed or provided with a rib 41 (Figure 20) which fits against the arm 31. Headed elements 42 which are carried by the rib are movable in slots 43 formed in the arm, the adjustment of the slide 36 along the arm being accomplished by a screw 44.

It will be apparent that the cam 38 pauses twice during each revolution. It is operative, therefore, to actuate the carriage during each second movement of the chains 4. The cam 38 is adjusted upon the shaft 8 so that the forward movements of the carriage 20 occur during the final portions of the can discharging movements of the chains. Thus as a can approaches the ends of the rails 1 it moves over the carriage 20, the dogs 26 moving downwardly as the can passes over them and returning to their normal positions as soon as they are released by the can. As a can reaches the position shown in Figure 12 the chains 4, and hence the bar 3, are approaching the final part of a forwarding movement. At this time the cam 38 is approaching the cam surface 37. The cam 38, therefore, is operative to advance the carriage 20 as the bar 3 approaches the limit of its forwarding movement. Owing to the greater speed of the carriage 20 the dogs 26 are moved into engagement with the mouth flange of the can, thereby to move the can ahead of the bar 3. As the carriage approaches the limit of its forwarding movement the can is moved so far beyond the forward edge of the plate 19 that it tips forward into the inverter I, as illustrated in Figure 13, the can utilizing the forward edge of the plate 19 as a pivot. In Figure 13 the chains and carriage are shown at the forward limits of their ranges of movement. It will be noted that when the chains and carriage are in such positions the noses of the dogs 26 are located beneath the forward edge of the bar 3. Hence as the can tips forward in the manner described the bar 3 is out of engagement with the neck of the can and will not interfere with the pivotal movement of the latter. Immediately thereafter the cam 38 is operative to release the arm 31 and permit the carriage 20 to return to its original position, the said carriage remaining in such position until being again actuated by the cam 38 to facilitate discharge of the succeeding can from the runway.

The inverter I to which the cans are delivered from the can runway includes spaced bars 45 which are fixed intermediate their ends to a shaft 46, the latter being journaled in bearing standards 47 which are mounted upon horizontal frame members 48. Curved plates 49 and 50 are carried by the bars 45, the said plates being arranged in back-to-back relation and extending in opposite directions with respect to the shaft 46. At their opposite ends the bars 45 carry parallel arms 51 and 52 which extend substantially at right angles with respect to the bars. Each arm is secured to the bars so as to provide a short extension 53 and a long extension 54, the corresponding sections of the said arms extending in opposite directions. Angularly extending elements 55 and 55a connect the long extensions 54 and the bars 45. The curved plates 49 and 50 and the arms 51 and 52 co-operate to provide two holders, each of which is adapted to receive a can from the can runway and right it, the plates 49 and 50 conforming generally to the contour of the cans and providing backs for the holders.

Means is provided for rotating the inverter to move the holders successively to a position to receive cans from the can runway and thereafter to right them. To this end the shaft 46 carries a sprocket 56 (Figure 7), the latter being connected by a chain 57 to a sprocket 58 which is fixed to the shaft 8. The chain 57 also passes around a sprocket 59 (Figure 2) which is carried by a vertical frame member 60 and in front of an idler pulley 61 which is carried by a horizontal frame member 62, the pulley 61 co-operating with the chain 57 to maintain the latter under the desired tension. It will be apparent that as the shaft 8 is rotated to move the cans along the rails 1 the inverter will be rotated step-by-step in a clockwise direction, the mechanism being so timed that during each movement the inverter rotates through an angular distance of substantially 90°. The inverter, therefore, makes a complete revolution in four movements, there being a pause after each movement.

One of the holders of the inverter is shown in the can receiving position in Figures 12 and 13. The drive mechanism 9 is operative to move the inverter to such a position as a can moves beyond the forward edge of the plate 19, the long extension 54 of the arm 51 moving a short distance into the mouth of the receptacle before coming to rest. As the inverter approaches the position shown the can tips forward in the manner described, the can pivoting first upon the forward edge of the plate 19 and thereafter upon the element 55 and assuming the position shown in dotted lines in Figure 13 in which it rests upon the back 49 of the holder in an inclined position. When the inverter occupies the position shown, the arm 51 is positioned between downwardly inclined plates P (Figure 7) which are spaced apart to provide a passage for the arms 51 and 52.

During its next movement the inverter moves to the position shown in full lines in Figure 3, the can sliding along the back of the holder, as the latter approaches such position, until its bottom flange engages the short extension 53 of the arm 52. As the inverter pauses the can tips forward by gravity and comes to rest upon a pair of angularly inclined bars 63 as indicated in dotted lines in Figure 3. The latter are adapted to lower the can upon the rails 64 and 64a to complete its righting movement the rails 64 and 64a providing a support which is located in a plane below the rails 1 of the can runway. To this end the said bars are pivotally connected at their inner ends to the rails 64 and are formed or provided at their outer ends with sector-like side plates 65 which are connected below the rails 64 by a bottom plate 66, it being noted that the bottom flange of the can enters shallow notches 64b (Figures 7 and 11) which are formed in the rails 64 as it comes to rest upon the bars 63.

The notches 64b permit the inverter to move the can nearer to an upright position than would otherwise be possible, the lowermost portion of the bottom flange moving momentarily below the plane of the tops of the rails 64 and 64a. Hence tipping of the can out of the inverter is insured. The bars 63 are supported in the position shown in Figure 3 by a roller 67 upon which the bottom plate 66 rests. The roller 67 is carried by a pair of arms 68 of an actuating member 69 which is pivotally mounted upon a shaft 70, the said shaft being carried by vertical frame members 71. A crank 72 is fixed to the shaft 70 (Figures 1, 4, and 7) and is connected by a link 73 to a crank 74 which is fixed to the shaft 8. The relative lengths of the cranks 72 and 74 are predetermined so that an oscillatory movement is imparted to the shaft 70, there being a pause between movements of the shaft in opposite directions. After the can has tipped forward upon the bars 63 to the dotted line position shown in Figure 3, and during the initial part of the succeeding movement of the inverter, the member 69 is pivoted forward in a clockwise direction. During this movement of the member 69 the roller 67 rides along the bottom plate 66 toward the outer end thereof to permit the bars 63 to lower by gravity to the position shown in Figure 11. As the bars 63 approach this position the can is deposited upon the rails 64 and 64a. In order to move the can along the rails out of the path of the inverter the member 69 carries a pair of arms 75 which are bent outwardly as best shown in Figure 7 to engage the can at opposite sides. The arms 75 are in a retracted position when the bars 63 are in a can receiving position. It will be apparent, therefore, that as the member 69 moves in a clockwise direction to lower a can upon the rails 64 in the manner described the arms 75 engage the can and push it forward along said rails, as best shown in Figure 11, the inverter rotating during this time to a position in which its remaining holder is moved to a can receiving position, that is to say to a position in which its parts occupy the same positions as occupied by corresponding parts of the companion holder in Figure 12. The movement of the member 69 is so controlled that when the bars 63 occupy the position shown in Figure 3 the arms 75 are located a short distance behind the can. Hence during the initial part of the rotary movement of the member 69, the said arms are moving toward the can, the bars 63 being lowered during this time. It will be apparent, therefore, that when the arms 75 engage the can to push it forward in the manner described the bars 63 are in, or are approaching, a horizontal position. During the final part of the forward movement of the arms 75 the can is pushed upon a platform 76, the member 69 being returned to its original position to receive another can from the inverter during the succeeding movement of the shaft 8, that is to say while the inverter is moving the can which has been delivered to its second holder to the position shown in Figure 3. In the embodiment illustrated the platform 76 includes a chain conveyor 77 which is provided with projections 78 for engaging the bottom flanges of the cans in order to move the latter along the platform out of the way of the succeeding cans.

It will be apparent that as the inverter 1 rotates step-by-step the holders thereof are moved successively to receive cans from the can runway and thereafter are moved to a position which will enable the cans to tip forward upon the bars 63. The inverter completes a revolution in four angular movements of approximately 90° each. The movements of the bars 3 which move the cans along the can runway occur simultaneously with the movements of the inverter. The angular movements of the inverter are, therefore, of such a magnitude that when one of the holders is in a position to receive a can from the runway, the other holder occupies a position two movements removed from such position and hence will be moved to a can receiving position as the succeeding can is discharged from the can runway. It will be noted that the bars 63 are inclined at such an angle that they arrest the movement of a can toward an upright position at a point which is substantially midway between the position at which it tips out of the inverter and the position at which it is supported upon the rails 64 and 64a. Tipping of the can beyond an upright position is, therefore, prevented. The lowering of the can gently upon the rails 64 and 64a has the further advantage that marring of the can is avoided.

In accordance with conventional practice the covers C' of the cans are moved along an elevated runway in the direction of the delivery end of the machine, the covers being subjected to the action of the desired cleansing mediums during their movement along the said runway. The runway, as illustrated in Figure 3, includes a bar 79 along which the covers are rolled, the latter being supported upon the said bar by their necks and being guided toward the delivery end of the machine by rods 80 and 81 which are arranged along opposite sides of the bar 79. The covers are moved along the runway by a series of elements 82 (Figures 10 and 16) which are carried by bars 83, the said elements being mounted for pivotal movement upon pins 84 which connect the bars in spaced relation. The bars 83 are mounted for longitudinal movement in a guideway which is provided by the angle member 79 and an angle member 85 (Figure 16) the said members being suitably supported from a side wall 87 of the runway. The elements 82 normally occupy the positions shown in Figure 10 owing to the greater weight of their lower ends. A pin 88 which is carried by the bars 83 is employed in connection with each of the elements 82, the said pins co-operating with the lower ends of the elements and serving to limit the upward movement of their upper ends.

The movement of the covers along the runway is effected by a reciprocatory movement of the bars 83, the upper ends of the elements 82 engaging the rear sides of the cover necks and pushing the covers a predetermined distance along the runway during each forward movement of the bars. In order to arrest the movement of the covers when the bars 83 reach the limit of a forward movement and while the said bars are returning to their original position the bar 79 is formed with a series of notches 89. The notches are so located that as the covers approach the limit of a forward movement they enter the notches and remain there during the return movement of the bars 83. During this movement of the said bars the upper ends of the elements 82 are moved downwardly as the elements pass beneath the succeeding covers along the runway, the said elements returning to their normal positions as they move slightly beyond the succeeding covers and approach the limit of their rearward movement. Hence during the succeeding forward movement of the bars 83 the elements 82 move the succeeding covers out of the notches 89 and along the guideway to the succeeding stations, the necks of the covers entering succeeding notches in the bar 79 as the bars 83 again approach the limit of their forward movement. In the apparatus illustrated the covers are arranged in the cover runway at substantially the same time that the cans are placed in the can runway, the cans and their covers moving through the machine at substantially the same speed and approaching the delivery end of the machine together.

At the delivery end of the machine the bar 79 and rods 80 and 81 incline downwardly to provide a runway section 90 down which the covers will roll by gravity, the bar 79 being increased in width at the juncture of the horizontal and inclined portions to provide an upwardly extending projection 91 over which the covers are rolled during their final forwarding movement by the cover advancing mechanism. As a cover rolls down the opposite side of the projection 91 its speed is accelerated and its rapid movement along the runway is insured. The rods 81 are formed at the lower end of the inclined runway section to provide an opening opposite a cover replacing member 92. The said member includes a back wall 93 (Figure 3) a side wall 94 and a bottom wall 95, there being no side wall adjacent the cover runway. As a cover rolls down the inclined runway section and approaches the lower end thereof it rolls upon a horizontal track section 96 (Figures 1 and 9) and is guided along the latter by a bar 96a and the rods 80. The bar 96a decreases in height so that as the cover passes beyond the guide rods 81 it tips sidewise into the member 92, the cover being caused to assume a predetermined position within the said member by an angularly extending plate 97 (Figure 9) and a gate 98. The plate 97 co-operates with the neck of the cover. Hence the position of the latter will be the same regardless of the shape of the cover flange or head. It will be apparent, therefore, that as a can is dicharged from the can runway the cover of the can is caused to roll down the cover runway, the cover moving ahead of the can and coming to rest in the cover replacing member during the interval that the can is being moved to an upright position and is being deposited upon the rails 64 and 64a.

Means is provided for lowering the cover replacing member 92 whereby the cover of a can is replaced as the can passes beneath the said member. To this end the member 92 is carried by bars 99 and 100 (Figures 9 and 21) which are pivotally mounted upon a shaft 101. The said shaft is mounted between the track bar 79 and a downwardly inclined frame member 102 at the opposite side of the machine. The bar 100 is connected by a link 103 (Figures 2 and 3) with an arm 104 which is supported for pivotal movement from the frame member 102. At its forward end the arm 104 is formed with a lateral extension 105 by which the gate 98 is carried. The arm 104 is connected by a link 106 (Figure 2) to one end of an arm 107. The latter extends over the shaft 8 and is pivotally connected at its opposite end to a standard 108 which is carried by the frame work of the machine. The arm 107 carries an element 109 (Figure 15) which is formed to provide a cam face 110, the said cam face being located in the path of a pin 111 which is carried by the hub of the sprocket 18. Hence as the shaft 8 rotates the pin 111 is operative to raise the arm 107 and to hold it momentarily in such position as the pin moves along the cam face 119. The upward movement of the arm 107 is transmitted by the link 106 to the arm 104. As the arm 104 moves upwardly it carries the gate 98 with it. At the same time the upward movement of the arm 104 is transmitted by the link 103 to the arm 100 and the cover replacing member 92 is caused to swing downwardly. The mechanism is so designed that the cover replacing member moves downwardly to rest upon the rear edge of the lip of a can as the latter is being moved forward by the arms 75. As the gate 98 is moving upwardly during the downward movement of the cover replacing member the cover is released and permitted to slide into the mouth of the can. Hence as the arms 75 continue to move the can forward the cover settles into the mouth of the can and is carried forward with the can. Thereafter as the pin 111 passes beyond the element 109 the arm 107 is permitted to return to its normal position. During the return movement of the arm 107 the cover replacing member is moved upwardly to receive another cover from the cover runway and the gate 98 is moved downwardly to a position in front of the said member.

In order that the cover replacing member will function in a similar manner with cans of various heights a lost motion connection is preferably provided between the bar 100 and the link 103. For this purpose the link is forked at one end as at 113 (Figure 5) to provide a slot 114, the pin 115 which connects the bar 100 and the link 103 being carried by the bar and being movable lengthwise in the slot 114. The cover replacing member normally tends to pivot downwardly by gravity. When it is in a position to receive a cover from the cover runway the pin 115 will, therefore, be located at the upper end of the slot 114. The mechanism is designed with respect to a can of standard height and when cans of such height pass through the machine the cover replacing member is lowered until the forward edge of the bottom wall 95 rests upon the lip of the can, as best shown in Figure 5, the pin 115 in such a case occupying the upper end of the slot 114 as described. In the event that a cover is to be applied to a can of a greater height the member 92 moves downwardly until the bottom wall thereof rests upon the lip of the can. The remainder of the upward movement of the arm 104, however, is lost, the cover replacing member remaining stationary during such movement of the arm while the pin 115 moves toward the lower end of the slot 114. It will be apparent, therefore, that the cover replacing mechanism is operative to replace the covers of cans of varying heights.

In the operation of the machine the cans are moved step-by-step along the can runway, one of them being discharged during the final part of each second forwarding movement of the chains 4. The final movement of a can along the can runway is effected by the slide 36 which, owing to its accelerated movement, pushes the can ahead of the bar 3 by which it has been advanced along the rails 1. As the can tips forward into the inverter, therefore, it is a substantial distance in advance of the bar 3 and hence its free pivotal movement is in no way retarded by the bar. The inverter I is rotated step-by-step to position the holders to receive the cans as they are discharged from the can runway. As a can leaves the runway and enters a holder of the inverter it completes a portion of its movement toward an upright position. During the succeeding angular movement of the inverter the can is moved further toward an upright position. The movement of the inverter is arrested at a point close enough to such upright position that the can will tip toward it by gravity, the bars 63 being operative to catch the can and lower it gently upon the rails 64 and 64a. As the can is advanced along the rails 64 and 64a the cover replacing member moves downwardly to permit the cover to slide by gravity upon the can, the latter being pushed upon the platform 76 during the final part of the forwarding movement of the arms 75. As the cans are lowered gently upon the rails 64 they will not rock back and forth upon their bottoms or tip over. Hence they can be moved immediately to a cover receiving position and accurate replacement of the covers is insured.

I claim as my invention:

1. In a can washing machine having a runway along which the cans are advanced in an inverted position, the combination of an inverter for righting said cans, means for rotating said inverter to move it first to a position to receive a can from said runway and thereafter to a position at which the can is discharged in an upright position and means upon which the righted can is deposited, said first named means being operative to further rotate said inverter in the same direction to move it to a position to receive another can from said runway.

2. In a can washing machine having a runway along which the cans are advanced in an inverted position, an inverter for righting said cans, said inverter having a plurality of can holders, means for rotating said inverter to move each of said holders in succession first to a position to receive a can from said runway and thereafter to a position at which the can is discharged in an upright position and means upon which the righted can is deposited.

3. In a can washing machine having a runway along which the cans are advanced in an inverted position, an inverter for righting said cans, said inverter having a plurality of can holders, means for rotating said inverter to move each of said holders in succession first to a position to receive a can from said runway and thereafter to a position at which the can is discharged in an upright position and means upon which the righted can is deposited, said first named means being operative to arrest the movement of said inverter as the cans are delivered to and discharged from said holders.

4. In a can washing machine having a runway along which the cans are advanced in an inverted position, an inverter for righting said cans, said inverter having a plurality of can holders, means for rotating said inverter to move each of said holders in succession first to a position to receive a can from said runway and thereafter to an angular position substantially 90° removed and at which the can is discharged and means upon which the righted can is deposited.

5. In a can washing machine having a runway along which the cans are advanced in an inverted position, an inverter for righting said cans, said inverter having a plurality of can holders, means for rotating said inverter to move each of said holders in succession first to a position to receive a can from said runway and thereafter to an angular position substantially 90° removed and at which the can is discharged and means upon which the righted can is deposited, said first named means being operative after the discharge of a can from one of said holders to rotate said inverter through an angular distance of substantially 90° to receive another can from said runway.

6. In a can washing machine having a runway along which the cans are advanced in an inverted position, an inverter for righting said cans, said inverter having a plurality of can holders, means for rotating said inverter to move each of said holders in succession first to a position to receive a can from said runway and thereafter to a position at which the can is discharged, a support upon which the righted can is deposited and means for moving said can along said support, said first named means being operative upon the discharge of a can from one of said holders to further rotate said inverter in the same direction to move a second of said holders to a position to receive a can from said runway.

7. In a can washing machine having a runway along which the cans are advanced in an inverted position, an inverter for righting said cans, a support upon which the righted cans are deposited, said inverter having a plurality of can holders and means for rotating said inverter to move said holders in succession to receive cans from said runway, each holder when moved to receive a can occupying an inclined position which will enable a can to move off said runway and tip forward into it by gravity, said means thereafter being operative to rotate said inverter to complete the movement of said can toward an upright position while moving a second of said holders toward a can receiving position.

8. In a can washing machine having a runway along which the cans are advanced in an inverted position, an inverter for righting said cans, a support upon which the righted cans are deposited, said inverter having a plurality of can holders and means for rotating said inverter step-by-step in the same direction to move said holders in succession to receive cans from said runway, each holder when moved to receive a can occupying an inclined position which will enable a can to move off said runway and tip forward into it by gravity, said means thereafter being operative to rotate said inverter to complete the movement of said can toward an upright position while moving a second of said holders toward a can receiving position.

9. In a can washing machine having a runway along which the cans are advanced in an inverted position, an inverter for righting said cans, a support upon which the righted cans are deposited, said inverter having an opposed pair of can holders and means for rotating said inverter to move said holders in succession to receive cans from said runway, each holder when moved to receive a can occupying an inclined position which will enable a can to move off said runway and tip forward into it by gravity, said means thereafter being operative to rotate said inverter to complete the movement of said can toward an upright position while moving the other of said holders toward a can receiving position.

10. In a can washing machine having a runway along which the cans are advanced in an inverted position, an inverter for righting said cans, a support upon which the righted cans are deposited, said inverter having an opposed pair of can holders and means for rotating said inverter step-by-step in the same direction to move said holders in succession to receive cans from said runway, each holder when moved to receive a can occupying an inclined position which will enable a can to move off said runway and tip forward into it by gravity, said means thereafter being operative to rotate said inverter to complete the movement of said can toward an upright position while moving the other of said holders toward a can receiving position.

11. In a can washing machine having a runway along which the cans are advanced in an inverted position, an inverter for righting said cans, a support upon which the righted cans are deposited, said inverter having an opposed pair of can holders and means for rotating said inverter step-by-step to move said holders in succession to receive cans from said runway, said inverter completing one revolution in four movements, each holder when moved to receive a can occupying an inclined position which will enable a can to move off said runway and tip forward into it by gravity, said means thereafter being operative to rotate said inverter to complete the movement of said can toward an upright position while moving the other of said holders toward a can receiving position.

12. In a can washing machine having a runway along which the cans are advanced in an inverted position, an inverter for righting said cans, a support upon which the righted cans are deposited, said inverter having an opposed pair of can holders, means for rotating said inverter step-by-step in the same direction to move said holders in succession to receive cans from said runway, said inverter completing one revolution in four movements, each holder when moved to receive a can occupying an inclined position which will enable a can to move off said runway and tip forward into it by gravity, said means thereafter being operative to rotate said inverter to complete the movement of said can toward an upright position while moving the other of said holders toward a can receiving position and means for moving the righted cans along said support.

13. In a can washing machine, the combination with a runway in which the cans are arranged in an inverted position, means for advancing said cans along said runway, said means including spaced chains between which the cans are positioned, bars which connect said chains and which are adapted to engage the necks of said cans, means for moving said chains to advance said cans along said runway, of an inverter for receiving said cans as they reach the end of said runway and tip forward by gravity, means for engaging each can as it approaches the end of said runway and for moving it ahead of its respective bar, whereby to insure its free pivotal movement as it tips forward into said inverter, means for rotating said inverter to complete the movement of said can toward an upright position and a support upon which the righted can is deposited.

14. In a can washing machine, the combination with a runway in which the cans are arranged in an inverted position, means for advancing said cans along said runway, said means including spaced chains between which the cans are positioned, bars which connect said chains and which are adapted to engage the necks of said cans, means for moving said chains intermittently to advance said cans step-by-step along said runway, of an inverter for receiving said cans as they reach the end of said runway and tip forward by gravity, the movements of said chains being timed so that as a can moves off the end of said runway in the manner described the chains are approaching the limit of a forwarding movement, means for engaging said can as it approaches the end of said runway and for moving it ahead of its respective bar, whereby to insure its free pivotal movement as it tips forward into said inverter, means for rotating said inverter to complete the movement of said can toward an upright position and a support upon which the righted can is deposited.

15. In a can washing machine, the combination with a runway in which the cans are arranged in an inverted position, means for advancing said cans along said runway, said means including spaced chains between which the cans are positioned, bars which connect said chains and which are adapted to engage the necks of said cans, means for moving said chains to advance said cans along said runway, an inverter for receiving said cans as they reach the end of said runway and tip forward by gravity, means for rotating said inverter to right said cans and means upon which the righted cans are deposited, of means for engaging each can as it approaches the end of said runway and for moving it ahead of its respective bar, whereby to insure its free pivotal movement as it tips forward into said inverter, said last named means including pivotally mounted elements which normally extend into the runway but which are depressed as a can passes over them, a slide which carries said elements and means for moving said slide lengthwise of said runway, said elements engaging the mouth flange of said can during a movement of said slide in the direction of said inverter.

16. In a can washing machine having a runway along which the cans are advanced in an inverted position, the combination of an inverter for righting said cans, said inverter having opposed can holders which are movable in succession to receive cans from said runway, means for rotating said inverter to move said cans toward an upright position, a support upon which said cans rest when in an upright position and means which is movable above said support to catch said cans as they approach an upright position, said means being movable to lower said cans gently upon said support.

17. In a can washing machine having a runway along which the cans are advanced in an inverted position, the combination of an inverter for righting said cans, said inverter having opposed can holders which are movable in succession to receive cans from said runway, means for rotating said inverter to move said cans toward an upright position, a support upon which said cans rest when in an upright position, means which is movable above said support to catch said cans as they approach an upright position, said means being movable to lower said cans gently upon said support and means for moving the righted cans along said support.

18. In a can washing machine having a runway along which the cans are advanced in an inverted position, the combination of an inverter, for righting said cans, said inverter having opposed can holders which are movable in succession to receive cans from said runway, means for rotating said inverter to move said cans toward an upright position, a support upon which said cans rest when in an upright position, pivotally mounted bars which are movable above said support to catch said cans as they approach an upright position, said bars being movable to lower said cans gently upon said support and means for moving the righted cans along said support.

19. In a can washing machine having a runway along which the cans are advanced in an inverted position, the combination of an inverter into which a can tips as it leaves said runway, means for rotating said inverter to move said can toward an upright position, a support upon which said can rests when in an upright position, bars which are pivotally connected to said support and which are movable to catch said can as the latter approaches an upright position, said bars being movable to lower said can gently upon said support and means for moving the upright can along said support, said last named means co-operating with said bars to lower said can upon said support as it moves into engagement with said can to move it along said support.

20. In a can washing machine having a runway along which the cans are advanced in an inverted position, the combination of an inverter into which a can tips as it leaves said runway, means for rotating said inverter to move said can toward an upright position, a support upon which said can rests when in an upright position, bars which are pivotally connected to said support, said bars having portions which depend below said support, a plate connecting the depending portions of said bars, said plate being located below said support, means for holding said bars above said support so that they catch said can as it approaches an upright position, said last named means including a member having a laterally extending arm upon which said plate rests, means for rotating said member through a predetermined angular distance to lower said arm and thereby lower said can and means carried by said member which is movable to push said can along said support as said arm is lowered in the manner described.

21. In a can washing machine in which the cans are advanced while in an inverted position and having a runway for the covers of the cans, the combination with mechanism for righting the cans and means for moving them to a cover receiving position, of a cover applying member to which the covers are delivered from said runway while the member occupies an elevated position, a gate for holding the covers in said member and means for lowering said member as a can moves beneath it so that the cover therein will slide out by gravity and be deposited upon the can, said member moving away from said gate as it is lowered, whereby to permit the cover to pass beneath said gate as it slides out of said member.

22. In a can washing machine in which the cans are advanced while in an inverted position and having a runway for the covers of the cans, the combination with mechanism for righting the cans and means for moving them to a cover receiving position, of a cover applying member to which the covers are delivered from said runway while the member occupies an elevated position, a gate for holding the covers in said member, means for lowering said member as a can moves beneath it so that the cover therein will slide out by gravity and be deposited upon the can and means for raising said gate as said member is lowered, whereby to enable the cover to pass beneath said gate as it slides out of said member.

23. In a can washing machine in which the cans are advanced while in an inverted position and having a runway for the covers of the cans, the combination with mechanism for righting the cans and means for moving them to a cover receiving position, of a cover applying member to which the covers are delivered from said runway while the member occupies an elevated position, a gate for holding the covers in said member and means for simultaneously raising said gate and lowering said member as a can moves beneath the latter, whereby to permit a cover to slide out of said member by gravity and be deposited upon said can.

24. In a can washing machine in which the cans are advanced while in an inverted position and having a runway for the covers of the cans, the combination with mechanism for righting the cans and means for moving them to a cover receiving position, of a cover applying member to which the covers are delivered from said runway while the member occupies an elevated position, a gate for holding the covers in said member, means for lowering said member so that it rests upon a can as the latter passes beneath it and means operative with said last named means for simultaneously moving said gate, whereby a cover in said member will slide out of it by gravity and pass beneath said gate to be deposited upon the can.

25. In a can washing machine in which the cans are advanced while in an inverted position and having a runway for the covers of the cans, the combination with mechanism for righting the cans and means for moving them to a cover receiving position, of a cover applying member to which the covers are delivered from said runway while the member occupies an elevated position, a gate for holding the covers in said member, means for lowering said member so that it rests upon a can as the latter passes beneath it, means operative with said last named means for simultaneously moving said gate, whereby a cover in said member will slide out of it by gravity and pass beneath said gate to be deposited upon the can and a lost motion connection between said member and said last named means, whereby to enable said member to be lowered upon cans of various heights.

26. In a can washing machine in which the cans are advanced while in an inverted position and having a runway for the covers of the cans, the combination with mechanism for righting the cans and means for moving them to a cover receiving position, of a cover applying member to which the covers are delivered from said runway while the member occupies an elevated position, a gate for holding the covers in said member, means for lowering said member so that it rests upon a can as the latter passes beneath it, whereby a cover in said member will slide out of it by gravity and be deposited upon the can, a lost motion connection between said member and said last named means, whereby to enable said member to be lowered upon cans of various heights and means for raising said gate as said member is lowered to enable the cover to pass beneath the gate.

27. In a can washing machine in which the cans are advanced while in an inverted position and having a runway for the covers of the cans, the combination with mechanism for righting the cans and means for moving them to a cover receiving position, of a cover applying member to which the covers are delivered from said runway while the member occupies an elevated position, a gate for holding the covers in said member, a link connecting said member and gate, and means for raising said gate to simultaneously lower said member, whereby to enable a cover in said member to slide out of it by gravity and be deposited upon a can as the latter moves therebeneath.

28. In a can washing machine having a runway along which the cans are advanced in an inverted position, an inverter for righting said cans, a support upon which the righted cans are deposited said inverter having an opposed pair of can holders, each of which has one position in which a can is received from said runway and a second position in which the can is discharged upon said support, means for moving the righted cans along said support and means operative on the movement of a can holder to a can receiving position to cause an operation of said can moving means.

29. In a can washing machine having a runway along which the cans are advanced in an inverted position, an inverter for righting said cans, a support upon which the righted cans are deposited, said inverter having an opposed pair of can holders, each of which has one position in which a can is received from said runway and a second position in which the can is discharged upon said support and means operative on the movement of one of the can holders to a can receiving position to move the can previously discharged from the other of said can holders along said support.

FRANK F. WOLF.

DISCLAIMER 2,085,936.—*Frank F. Wolf*, Cattaraugus, N. Y. CAN WASHING MACHINE. Patent dated July 6, 1937. Disclaimer filed February 8, 1938, by the assignee, *Oakes & Burger Company, Inc.*

Hereby enters this disclaimer in respect to claims 1, 2, 3, 6, 28, and 29 of said Letters Patent.

[*Official Gazette March 1, 1938.*]